United States Patent [19]
Jung

[11] Patent Number: 5,956,109
[45] Date of Patent: *Sep. 21, 1999

[54] METHOD OF FABRICATING COLOR FILTERS USED IN A LIQUID CRYSTAL DISPLAY

[75] Inventor: Sung Ki Jung, Seoul, Rep. of Korea

[73] Assignee: Samsung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/563,699

[22] Filed: Nov. 28, 1995

[30] Foreign Application Priority Data

Nov. 28, 1994 [KR] Rep. of Korea ..................... 94-31471

[51] Int. Cl.$^6$ ................................................. G02F 1/1333
[52] U.S. Cl. ............................................................. 349/110
[58] Field of Search ..................... 349/106, 110, 349/187

[56] References Cited

U.S. PATENT DOCUMENTS

| | | | |
|---|---|---|---|
| 4,837,098 | 6/1989 | Shimamura et al. | 349/187 |
| 5,398,126 | 3/1995 | Takao | 349/110 |
| 5,495,354 | 2/1996 | Jo | 349/110 |
| 5,631,753 | 5/1997 | Hamaguchi et al. | 349/110 |
| 5,681,675 | 10/1997 | Kunauchi | 349/108 |
| 5,684,553 | 11/1997 | Fukuchi | 349/110 |

FOREIGN PATENT DOCUMENTS

| | | | |
|---|---|---|---|
| 1-245221 | 9/1989 | Japan | 349/153 |
| 6-82786 | 3/1994 | Japan . | |

*Primary Examiner*—James A. Dudek
*Attorney, Agent, or Firm*—Pillsbury Madison & Sutro LLP

[57] ABSTRACT

A method of fabricating color filters used in an LCD, which includes the steps of forming a black matrix on a glass substrate, sequentially forming a first to a third color filter layer between the parts of the black matrix with the same height, removing the pigment residue on the black matrix, and forming a transparent electrode layer over the color filter layers.

8 Claims, 5 Drawing Sheets

METHOD OF FABRICATING COLOR FILTERS USED IN A LIQUID CRYSTAL DISPLAY

BACKGROUND OF THE INVENTION (1) Field of the Invention

The present invention concerns color filters used in a liquid crystal display (LCD), and more particularly to such color filters provided with means for preventing them from being damaged.

(2) Description of Prior Art

Generally, an LCD comprises a lower TFT substrate provided with a plurality of thin film transistors (TFTs), a liquid crystal layer, and an upper substrate provided with color filters consisting of red, green and blue color filtering. Referring to FIGS. 2A to 2I, a conventional color LCD is described concerning its fabrication.

A glass substrate 1 is prepared by cutting and polishing, and then applied with a light-blocking black matrix 2 made of chromium with a thickness of 1000 to 2000 Å by sputtering, to prevent the TFTs from being degraded. A negative photoresist 3 with an optimum spectral property is applied to the surface of the substrate 1 holding the black matrix. The negative photoresist may be a color photosensitive acrylic resin with a dispersion of a pigment. The photoresist is softly baked on a hot plate at a temperature 80 to 110° C. for 90 seconds, and then applied with an oxygen shield film 4 of a water soluble resin for preventing the oxidation of the photoresist during exposure to light. After drying, the surface is exposed to ultraviolet rays, as indicated by the reference numeral 5 in FIG. 2D.

After the oxygen shield film 4 is subjected to deionized water (DIW) for 3 to 5 minutes to remove it, the substrate is processed by a developing agent for about 2 to 3 minutes, and then rinsed by DIW for 1 to 2 minutes, thus producing a first color filter layer 6 with an optimum red spectral property, as shown in FIG. 2F. Likewise, a second and a third color filter layer 7 and 8 respectively with an optimum green and an optimum blue spectral property are sequentially formed over the substrate 1. Of course, the second and the third color filter layer also may be made of a color photosensitive acrylic resin with a dispersion of a pigment. The first, second and third color filter layers partly overlap the black matrix 2.

The first, second and third color filter layers 6, 7 and 8, which respectively represent red(R), green(G) and blue(B), are covered by a protective layer 9 to protect and flatten them. The protective layer 9 may be produced by spreading a transparent resin such as polyimide, polyacrylate, polyurethane, etc. on the black matrix 2 and color filter layers 6, 7, 8, with a thickness of about 1 to 3 $\mu$m, and then heating on a hot plate with a temperature of 150 to 220° C. for 5 minutes, as shown in FIG. 2H. Finally, an indium tin oxide (ITO) electrode layer 10, which is applied with an LCD drive voltage, is formed on the whole surface of the protective layer 9 with a thickness of about 500 to 1800 Å, as shown in FIG. 2I, thus completing the upper substrate. Hence, there is provided a conventional LCD consisting of the glass substrate 1, black matrix 2 formed on the glass substrate 1, first to third color filter layers 6, 7, 8, protective layer 9 formed over the filter layers, and transparent electrode layer 10.

Such conventional color filters suffer the protubrances formed by foreign matter or particles in the protective layer, which cause low yield rate and cell gap-maintaining failure. Moreover, the electrical resistance and the deviation thereof increase in the regions where the black matrix contacts the substrate after forming the color filter layers, thus resulting in adverse effects on the LCD operation. Besides, the adhesive force is weakened in the regions at the boundary of the black matrix which is printed on the substrate in a sealed manner.

SUMMARY OF THE INVENTION

It is an object of the present invention to make the conventional protective layer, unnecessary so as to simplify the LCD fabrication process and thus reducing the manufacturing cost.

It is another object of the present invention to provide means for removing the pigment residue on the black matrix in the regions where the black matrix contacts the transparent electrode layer, to achieve low electrical resistance.

It is still another object of the present invention to provide means for enhancing the adhesive force in the regions at the boundary of the black matrix which is printed on the substrate in a sealed manner, in order to improve the yield rate.

According to an embodiment of the present invention, a method of fabricating color filters used in an LCD comprises the steps of forming a black matrix on a glass substrate, sequentially forming a first to a third color filter layer between the parts of the black matrix with the same height, removing the pigment residue from the black matrix, and forming a transparent electrode layer over the color filter layers.

According to another embodiment of the present invention, a method of fabricating color filters used in an LCD comprises the steps of forming a black matrix on a glass substrate, sequentially forming a first to a third color filter layer between the parts of the black matrix with the same height, removing the pigment residue on the black matrix by ashing process, forming a transparent electrode layer over the color filter layers, and patterning the transparent electrode layer.

The present invention will now be described more specifically with reference to the attached drawings, only by of example.

DETAILED DESCRIPTION OF THE PREFERRED EMBODIMENT

Figure 1:
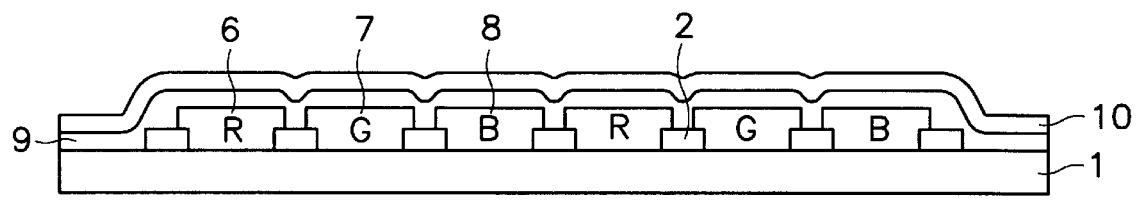
FIG. 1 is a schematic cross-sectional view for illustrating the structure of a conventional LCD.
Figure 3:
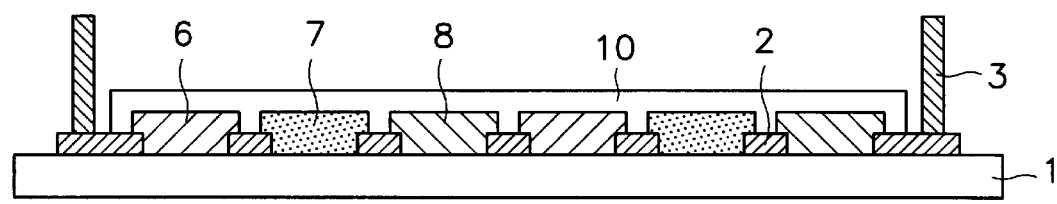
FIG. 3 is a schematic cross-sectional view for illustrating the structure of the color filters of the invention.
Figure 2A:
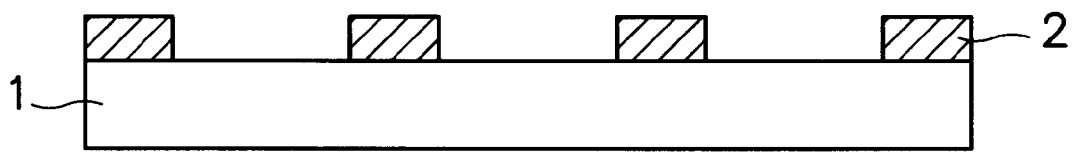
FIGS. 2A to 2I are schematic cross-sectional views for illustrating a conventional method of fabricating color filters used in an LCD.
Figure 2B:
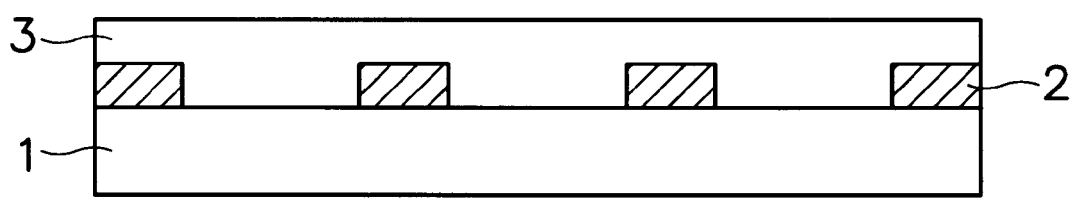
Figure 2C:
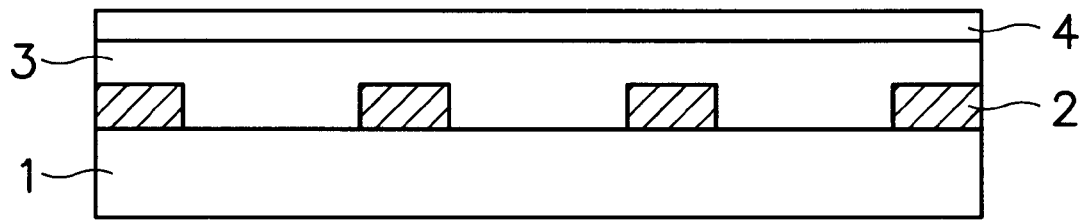
Figure 2D:
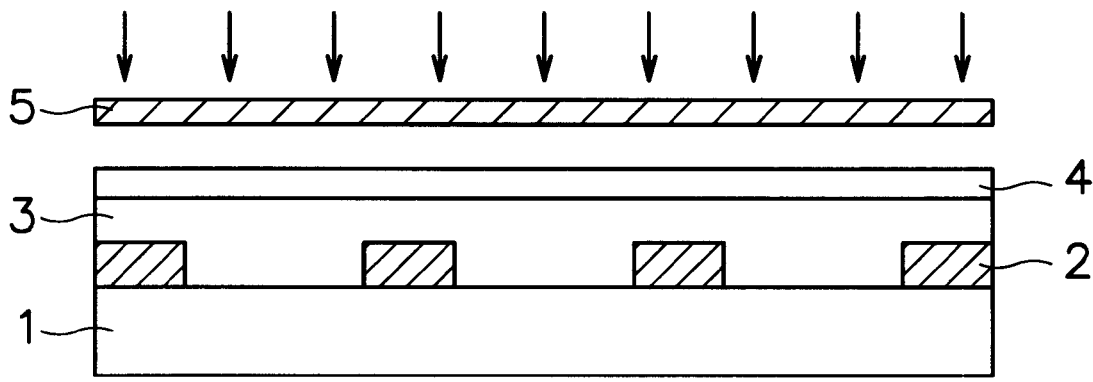
Figure 2E:
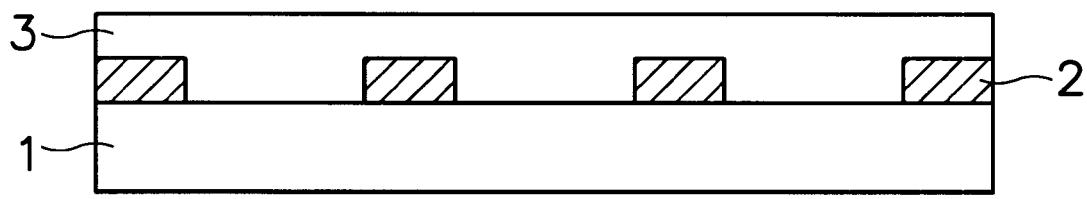
Figure 2F:
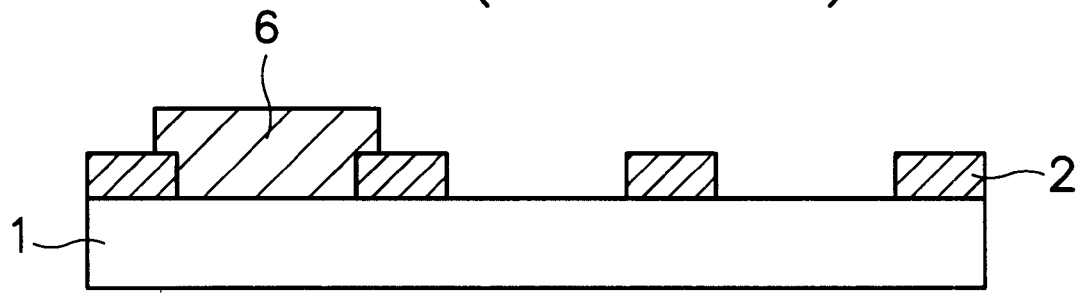
Figure 2G:
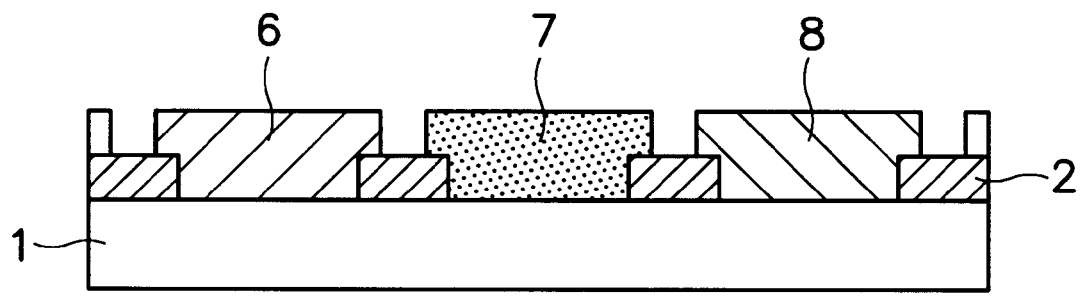
Figure 2H:
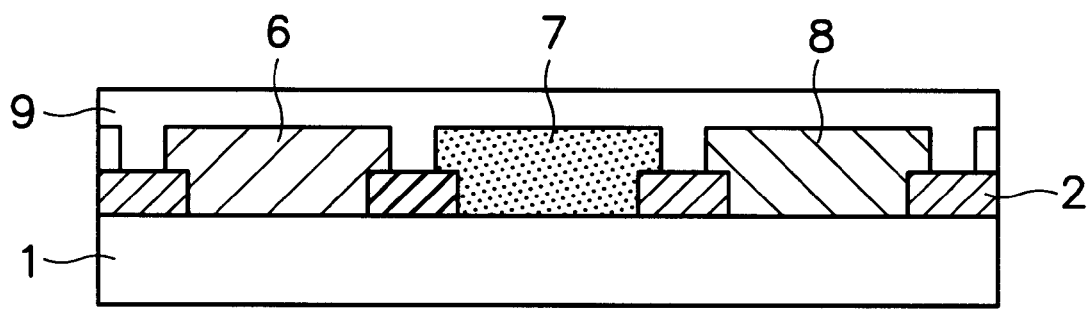
Figure 2I:
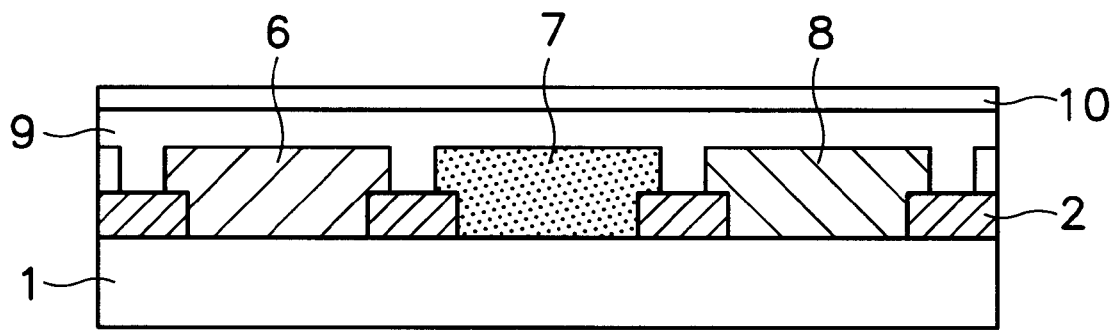
Figure 4:
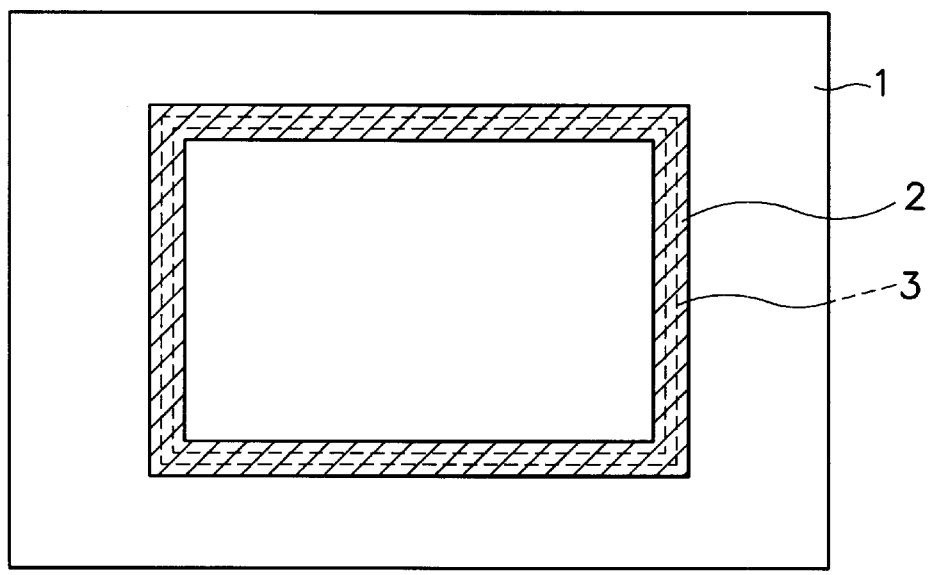
FIG. 4 shows the boundary regions of the black matrix where the black matrix contacts the glass substrate in a sealed manner.
Figure 5:
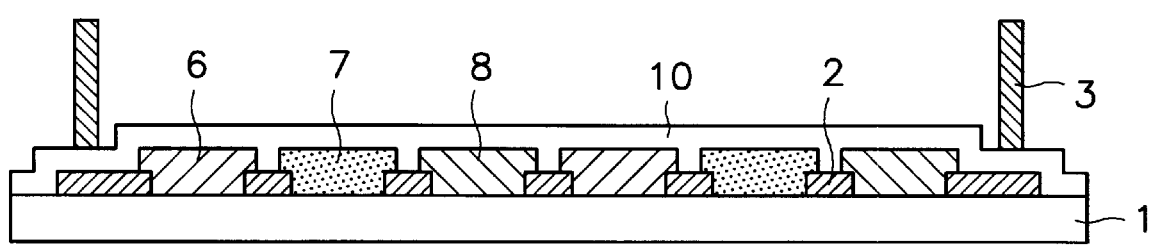
FIG. 5 is a cross-sectional view for illustrating the structure of the color filters of the invention.

According to the present invention, a method of fabricating color filters used in an LCD is described as follows:

A chromium or organic pigment layer is deposited on a glass substrate 1 with a thickness of about 1000 to 2000 Å, and then a photoresist pattern applied to the pigment layer.

The pigment layer is subjected to a wet-etching process using chromium etchant to produce black matrix 2 with a width of 20 to 50 μm by employing the photoresist pattern as a mask. A red photoresist 6 is applied to the surface of the substrate 1 containing the black matrix 2, with a thickness of about 1.0 to 2.0 μm, by means of spin coating or roll coating, and softly baked on a hot plate at the temperature of 80 to 110° C. An oxide shield layer 4 of polyvinyl alcohol (PVA) is applied to the whole surface in order to prevent the photoresist from being oxidized when exposed to light, and then dried.

Thereafter, a photomask 5 is set over the PVA layer 4 for exposure to ultraviolet rays. The oxide shield layer 4 is completely removed by dipping in DIW for 3 to 10 minutes. After showering with or horizontally dipping in a proper developing agent for 100 to 200 seconds, the exposed surface is baked hard at 220° C. for 30 minutes, to obtain first color filter layer 6 of the red photoresist. Likewise, a second and a third color filter layer 7 and 8, respectively of green and blue photoresist are produced. In this case, the color filter layers come to have an optimum spectral property, partly overlapping the black matrix 2, with a gap of about 10 to 20 μm between them.

A transparent conductive layer 10 of ITO, used to apply the LCD drive voltage, is formed over the first to the third R, G, B color filter layers 6, 7, 8, with a thickness of 500 to 2500 Å, by means of sputtering deposition. A metal mask is employed to form the transparent conductive layer 10 up to the edges of the black matrix or through the glass substrate 1, patterned by normal photolithography, which is to etch and ash the transparent conductive layer of ITO according to a photoresist (PR) pattern mask. Thereafter, the PR pattern mask is removed. In this case, an ashing process may be performed after the PR pattern mask, and then the ITO pattern obtained by the etching process is used as a mask. The thickness of the transparent conductive layer is between 500 Å and 1500 Å.

Then, the substrate 1 is subjected to the U.V. ashing process or plasma ashing process through the patterned transparent conductive layer in order to remove the pigment residue in the non-active region. Comparing the LCD of the invention to the conventional one, the LCD of the invention is deprived of the protective layer 9, and has the transparent conductive layer 10 formed up to the edges of the black matrix so as to remove the pigment residue in the non-active regions at the boundary of the color filters by means of the U.V ashing process. Thus, the sealed state of the LCD is not degraded, the transparent conductive layer is prevented from being broken, and foreign matter or particles that occurred inherently in the forming process of the protective layer are prevented. Hence, there is prevented the damaging of the color filters.

What is claimed is:

1. A method of fabricating color filters used in an LCD, comprising the steps of:

forming a segmented black matrix on a surface of a glass substrate;

sequentially forming a first, second and third color filter layer between segments of said black matrix;

forming a transparent electrode layer over said first, second and third color filter layers and in direct contact with said black matrix; and removing pigment residue from said black matrix following the formation of said transparent electrode layer.

2. A method as defined in claim 1, wherein:

said pigment residue is removed by subjecting the surface of said substrate to a U.V. ashing process.

3. A method as defined in claim 1, wherein said black matrix is electrically conductive.

4. A method as defined in claim 1, wherein:

said black matrix is formed by being printed on said glass substrate surface in a sealed manner.

5. A method of fabricating color filters used in an LCD, comprising the steps of:

forming a black matrix on a glass substrate, sequentially forming a first, second and third color filter layer between parts of said black matrix, removing pigment residue from said black matrix by ashing, forming a transparent electrode layer over said color filter layers, and patterning said transparent electrode layer.

6. A method as defined in claim 5, wherein said ashing is performed by one of a U.V. and plasma ashing process.

7. A method of manufacturing a liquid crystal display panel, comprising the steps of:

forming a conductive black matrix on a surface of an insulating substrate;

forming a plurality of color filters on said matrix using pigment;

removing residue pigment from said black matrix by ashing to expose portions of the black matrix; and forming a transparent electrode layer over said color filters and directly contacting said exposed portions of the black matrix.

8. A method as defined in claim 7, wherein said residue is removed by subjecting the surface of the substrate.

* * * * *